United States Patent
Stevens

(10) Patent No.: US 8,450,870 B1
(45) Date of Patent: May 28, 2013

(54) USE OF A SEA ANCHOR USING RIVER CURRENT TO GENERATE ELECTRICITY

(76) Inventor: Geoffrey Stevens, Tacoma, WA (US)

( * ) Notice: Subject to any disclaimer, the term of this patent is extended or adjusted under 35 U.S.C. 154(b) by 31 days.

(21) Appl. No.: 13/268,185

(22) Filed: Oct. 7, 2011

(51) Int. Cl.
  *F03B 13/00* (2006.01)
(52) U.S. Cl.
  USPC .......................................... 290/54
(58) Field of Classification Search
  USPC .......................................... 290/54
  IPC ........................................ F03B 13/00
  See application file for complete search history.

(56) References Cited

U.S. PATENT DOCUMENTS

| | | | |
|---|---|---|---|
| 3,134,355 A | 5/1964 | Jakosky | |
| 3,887,817 A * | 6/1975 | Steelman | 290/43 |
| 4,313,059 A * | 1/1982 | Howard | 290/54 |
| 4,481,900 A | 11/1984 | Rutten et al. | |
| 6,498,402 B2 * | 12/2002 | Saiz | 290/55 |
| 7,223,137 B1 | 5/2007 | Sosnowski | |
| 7,557,456 B2 * | 7/2009 | Kornbluh et al. | 290/42 |
| 7,602,076 B1 | 10/2009 | Sipp | |
| 7,654,802 B2 | 2/2010 | Crawford, Jr. et al. | |
| 7,785,065 B2 | 8/2010 | Clemens | |
| 7,855,468 B2 | 12/2010 | Lin | |
| 8,334,605 B2 * | 12/2012 | Catinella | 290/42 |
| 2010/0127501 A1 * | 5/2010 | Steelman | 290/54 |
| 2011/0057442 A1 | 3/2011 | Chauvin | |
| 2012/0167828 A1 * | 7/2012 | Gagnon | 119/215 |

* cited by examiner

*Primary Examiner* — Vanessa Girardi
(74) *Attorney, Agent, or Firm* — Lawrence J. Gibney, Jr.

(57) ABSTRACT

A power-generating system using sea current and sea anchors provides a constant source of renewable clean energy. The device will not disturb the environment and have relatively low maintenance requirements. The device will not disturb the flow of traffic on rivers and will not interfere with maritime activities. The system will also be self contained so that it will be relatively easy to move the device, if needed in the event of extremely inclement weather conditions.

6 Claims, 3 Drawing Sheets

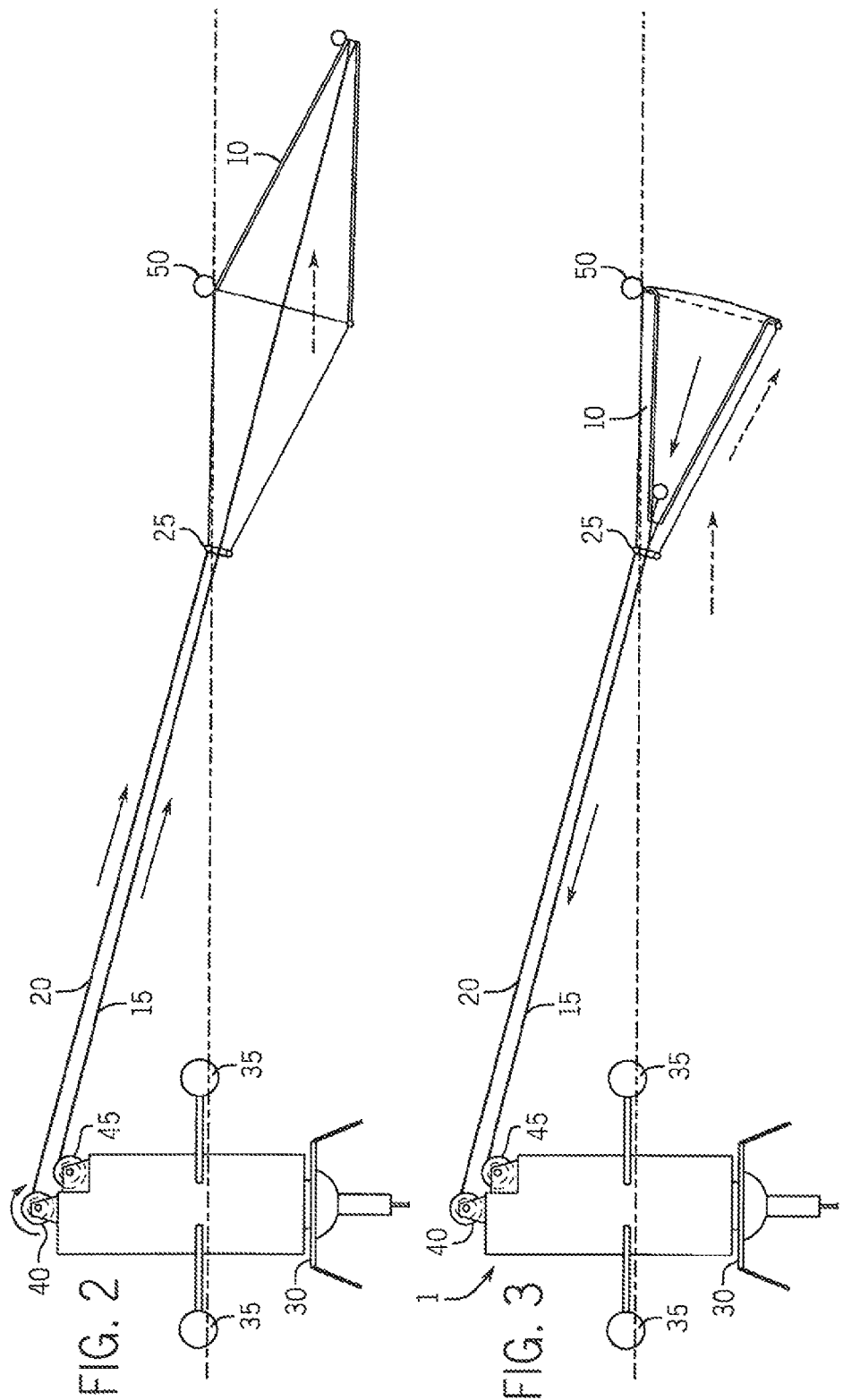

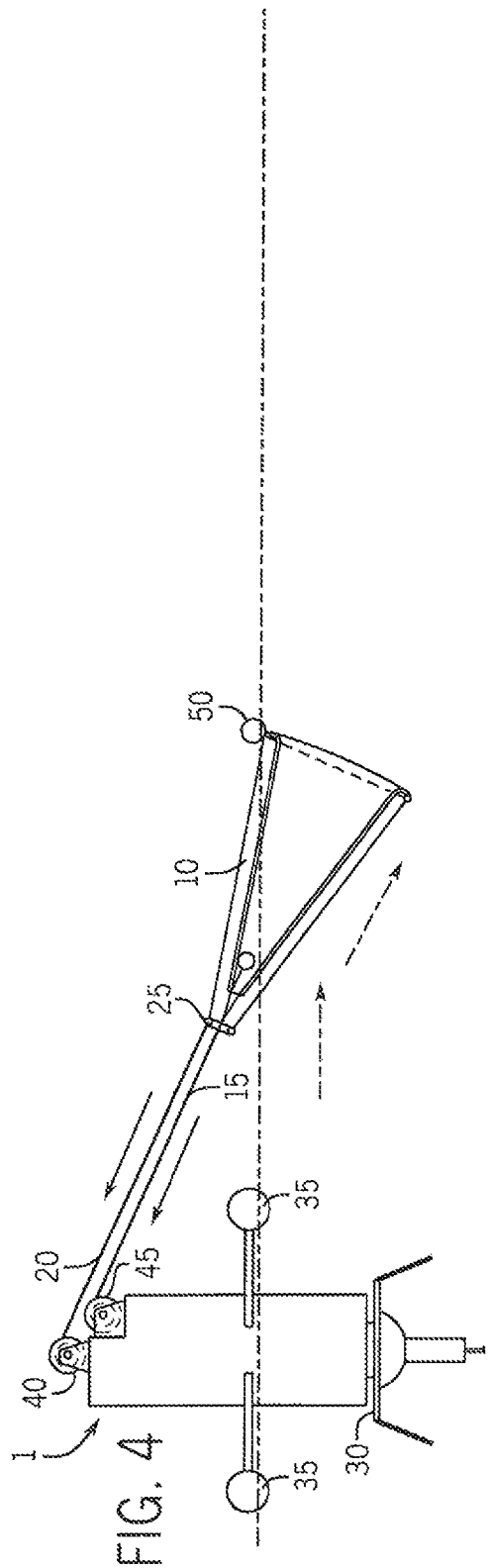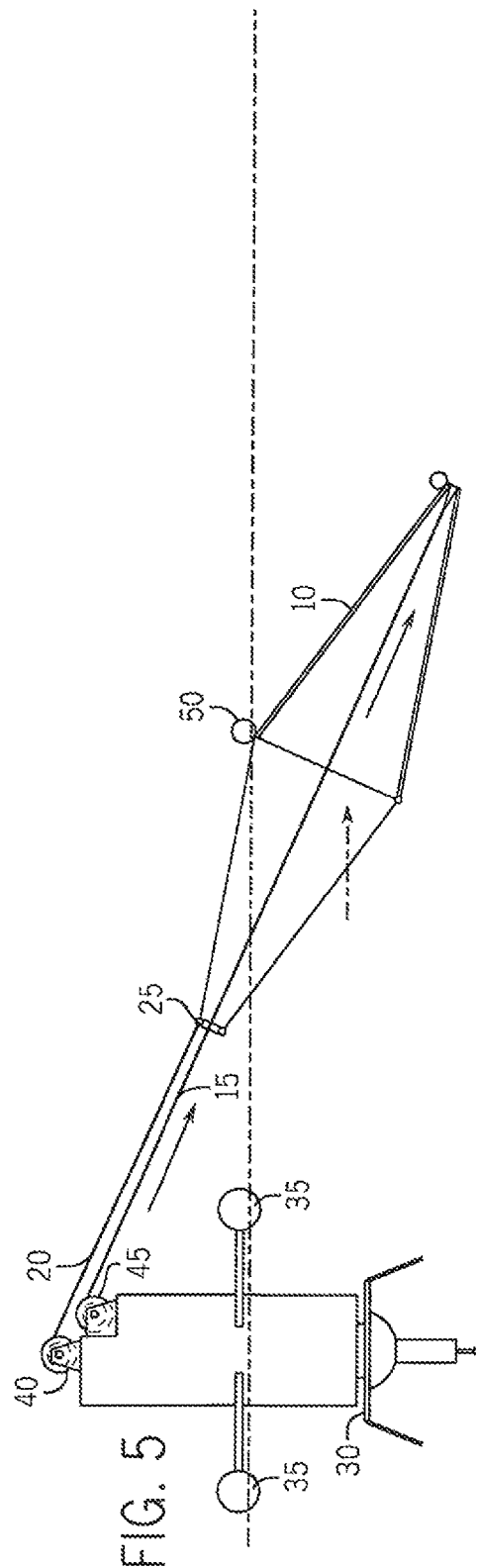

USE OF A SEA ANCHOR USING RIVER CURRENT TO GENERATE ELECTRICITY

BACKGROUND OF THE INVENTION

A. Field of the Invention

This relates to power generation using a plurality of sea anchors and placing the sea anchors in a river. As the current passes by the sea anchors, a pulley and winch system would be used to generate electricity.

The advantage to this system is that it will create electricity in a uniform fashion and does not depend on the vagaries of the wind to generate electrical power.

B. Prior Art

Representative examples of these include Sosnowski, U.S. Pat. No. 7,223,137, Crawford, U.S. Pat. No. 7,654,802, Clemens, U.S. Pat. No. 7,785,065, and Lan, U.S. Pat. No. 7,855,468.

This device specifically is used with sea anchors, which are large devices placed in the river current that are ordinarily used to stabilize or maintain the position of a vessel such as a barge. The sea anchor will be in the river or current and the current will constantly pull on the sea anchor. A cable connected to a generator is attached to an electrical generating station that is secured to the river bottom floor. As the sea anchor is pulled by the current, a cable moves and generates electricity. The prior art does not contemplate the generation of electricity in this fashion using river, tidal or ocean currents and sea anchors.

BRIEF SUMMARY OF THE INVENTION

One of the problems that has become highlighted in the national discourse recently has been the ability to generate electrical energy or power cheaply, efficiently, and renewably. The use of fossil fuels is becoming more and more expensive to generate electricity with the resultant associated pollution and an alternative means to generate electricity must be found.

Some of the alternative means that are currently being discussed include solar power and wind power; however, both of these types of electrical power generation are limited by the amount of cloud cover and the amount of wind, respectively.

Another means to generate electricity that is being discussed is the use of hydroelectric power that is generated by water flowing in rivers to turn generators. This type of power generation requires a large flow of water and the water typically is dammed and the flow regulated by a dam system. In order to produce the required flow this type of system normally requires a change in elevation in the flow of water. While this type of system is probably very practical in Idaho, it would be impractical in Florida.

The current application does not depend on a change in elevation and there is no need to regulate the flow of water using a dam system. Unlike the limitations of solar and wind power generation this power is generated by the flow of river or ocean current, which is constant.

The current application uses a plurality of sea anchors and river or ocean current to generate electricity. The sea anchor is essentially a very large sock that is placed in a river that is normally used to steady and maintain a vessel such as a boat or a barge. The sea anchor is not typically secured to the ground or river bottom but, instead, is floating and is mainly used for a means of stabilization so that the boat is aligned in the same general direction as the current.

In this application, a plurality of sea anchors is placed in a river or ocean current. The sea anchor will move with the current while at the same time maintaining the appropriate position of the equipment.

In this application, a fixed structure is affixed to the ground surface of the river bottom. An electrical generating station is placed within the secured, fixed structure.

A pair of cables will extend from the fixed structure and will be secured to the sea anchor. One of the cables will be allowed to gradually move the sea anchor away from the fixed structure while the other cable will be geared to the electrical generating means.

One of the cables is secured to the interior of the sea anchor and will travel a predetermined distance until it stops. As this cable allows the sea anchor to travel with the river or ocean current the other cable that is attached to the sea anchor will rotate an electrical generating means.

Once the cable stops at the predetermined distance away from the fixed structure the sea anchor will invert because the cable that is secured to the electrical generating means will continue to travel with the current and force the sea anchor to become inverted. At a predetermined position with the sea anchor inverted, the sea anchor is then retrieved by the cable this is secured to the interior of the sea anchor. Because the sea anchor is inverted when retrieved, much less force is required to retrieve in order to reposition the sea anchor, thereby making a net positive energy production.

In order to insure that the device operates constantly, it is important that the position of the device remains relatively constant and is relatively level. A plurality of leveling pontoons will be added to the outside of the electrical generating station to insure a constant position.

In this application, the current, which is typically constant in most rivers, will impact the sea anchor and force the sea anchor and cables to move back and forth in a predetermined fashion. This, in turn, will move the cables back and forth and generate electricity.

In order to insure that the sea anchor does not sink to the bottom of the river a means to float the sea anchor is provided. Additionally in order to make sure that the shape of the sea anchor does not change some reinforcing means are also added to maintain the shape of the sea anchor that has been placed in the river.

Sea anchors are usually exposed to water constantly and often swift currents. The material that is used for a sea anchor should be able to withstand the forces that will be placed on the sea anchor. Additionally the cables that are attached to the electrical generating station and the sea anchor should also be selected to withstand extremes in weather conditions.

Although river currents are discussed in this application, this device can be used in any location with constant current such as a river, ocean setting or in any other area with large tidal shifts. The device can be mounted to a river or ocean bottom and can also be secured to any other type of fixed platform such as a ship.

BRIEF DESCRIPTION OF THE DRAWINGS

FIG. 2 is a front view of the device depicting the forces that are placed on the cables as the sea anchor moves away from the electrical generating station.

FIG. 3 is a front view of the sea anchor moving towards the electrical generating station with the sea anchor inverted.

FIG. 4 is a front view of the sea anchor at the closest point to the electrical generating station prior to being released to enter the stream in the river.

FIG. 5 is a front view of the sea anchor being deployed and moving away from the electrical generating station.

NUMBERING REFERENCES

Figure 1:
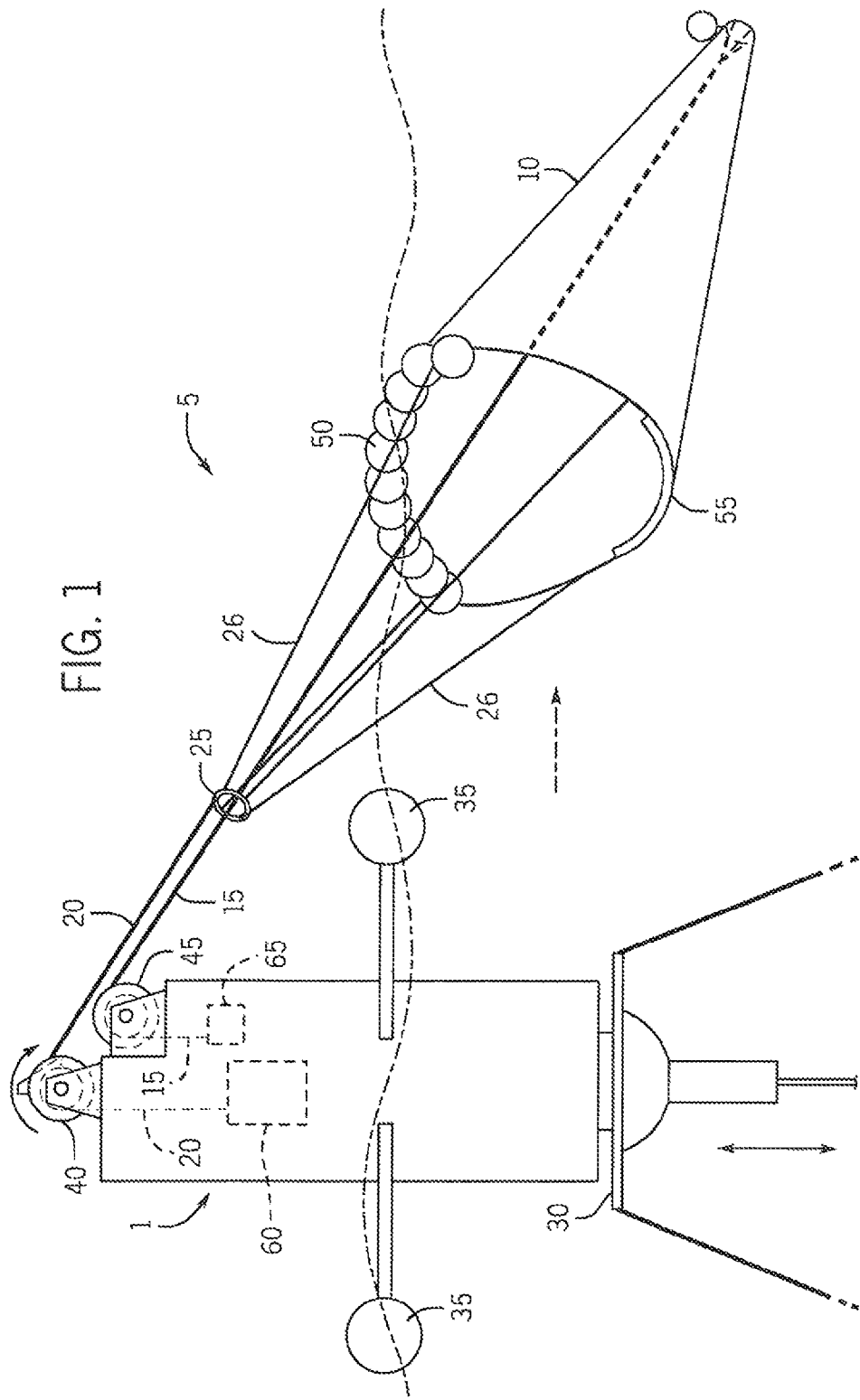
FIG. 1 is an isometric view of the device depicting the fixed structure, the electrical generating station, the cables and sea anchor.

1 Electrical generating station
5 Device
10 Sea Anchor
15 Second Pulley Cable
20 First Pulley Cable
25 Cable Ring
26 Sea Anchor Cables
30 Platform
35 Platform Pontoons
40 First Pulley
45 Second Pulley
50 Sea Anchor Floats
50 Reinforcing Member
60 Electrical Generating Equipment
65 Winch

DETAILED DESCRIPTION OF THE EMBODIMENTS

In this application, a sea anchor 10, which is usually conical, is placed in a river or the ocean with a current. The size and shape of the sea anchor may depend on the amount and force of current for a particular river or other moving body of water. For purposes of this application the use of the device in a river will be discussed although the device can also be used in the ocean. Additionally the figures depict the structure being secured to the river bottom, the structure may also be secured to the ocean bottom or may also be secured to a fixed platform such as a ship.

Regardless of the exact location of placement of the device it is important to calculate the forces that will be exerted on the cables and other pieces of equipment in order to avoid damage to the equipment.

Ideally a portion of the sea anchor should remain above the surface of the water to prevent excessive force on the sea anchor, the cables or the electrical generating station and the platform.

In order to insure that the sea anchor 10 does not sink below the surface of the water, a plurality of sea anchor floats 50 will be provided on the top surface of the sea anchor. Additionally in order to insure that the sea anchor maintains its shape a reinforcing member 55 is provided on one side of the sea anchor such as depicted in FIG. 1.

The sea anchor will be secured to an electrical generating station 1 with two cables, 15 and 20, a second pulley cable and a first cable pulley respectively, that are supported by pulleys, a first pulley 40 and a second pulley 45.

FIG. 4 depicts the sea anchor and cables in close proximity to the electrical generating station 1.

The second pulley cable 15 will allow the sea anchor 10 to move with the current for a predetermined distance away from the electrical generating station 1. At the same that the second pulley cable 15 is permitting the movement of the sea anchor the first pulley cable 20 is secured to a first pulley 40 which is turn permits rotations of electrical generating equipment 60 within the fixed structure 1.

Once the second pulley cable 15 moves a predetermined distance as determined by software that determines the force on the sea anchor, the second pulley cable 15 stops moving. A winch 60 which secures one end of the second pulley cable controls the movement of the second pulley cable; the winch is located within the electrical generating station. One end of the second pulley cable 15 is secured to the interior of the sea anchor. Although the movement of second pulley cable 15 stops, the first pulley cable 20 that is attached to the exterior of the sea anchor 10 continues to move.

As the first pulley cable 20 continues to move with the current with the second pulley cable 15 not moving the sea anchor 10 will become inverted such as shown in FIG. 3. Once the sea anchor is inverted such as depicted in FIG. 3 the cables 15 and 20 will begin to retrieve the sea anchor 10 and bring it closer to the electrical generating station 1.

During the retrieval and because the sea anchor is inverted, much less energy is required to pull the sea anchor close to the electrical generating station.

Once the sea anchor is positioned at a predetermined position in close proximity to the electrical generating station the sea anchor is again allowed to invert once again and be pulled by the river current away from the electrical generating station. This process of letting the sea anchor float with the current away from the electrical generating station and then be retrieved will be repeated over and over again to generate a positive amount of power.

In order to address the vagaries of the river current a cable ring 25 is placed on this device and secured at one end by the first pulley cable 20. The cable ring 25 is secured to the sea anchor 10 by a plurality of sea anchor cables 26. The cable ring 25 will maintain the correct positioning of the sea anchor 10.

The second pulley cable 15 is threaded through the interior of the cable ring 25 and secured to the interior of the sea anchor 10.

As the sea anchor 10 moves in the river, tension will be placed on cable 20 and rotate the first pulley 40 that in turn will rotate electrical generating means that is contained within the electrical generating station 1. The platform 30 that secures the electrical generating station is probably secured to the bottom of the river or ocean bottom.

In order to insure that the appropriate length of cable is being used and the appropriate sequence of positioning and retrieving the sea anchor is accomplished, software 70 is also provided to insure that the operation is as automatic as possible. The device is designed to be operated hands free and it is contemplated to be operated remotely.

The system is designed so that the sea anchor 10 reaches a predetermined programmed distance away from the electrical generating station 1 and then retrieved once the sea anchor has become inverted to reduce the power that is required to retrieve the sea anchor 10.

The first pulley cable 20 is secured to the cable ring 25, which is formed as part of the sea anchor 10. The cable ring 25 keeps the cable, which is secured to the sea anchor, in a relatively stable and centered position relative to the second cable 15. This, in turn, enables the sea anchor to be retrieved once inverted with minimal resistance because the position is maintained.

The electrical generating station 1 is placed on a platform 30 in the river. Pontoons 35 are placed on the outside of the electrical generating station 1 so that the position of the electrical generating station 1 remains relatively constant. The platform 30 may or may not be secured to the river bed.

The tension that is produced on the cable 20 produces movement of the components of the electrical generating station. As the power is generated the power may be stored in batteries or may be directly integrated into the power grid.

When the device is idle, the sea anchor 10 floats, thus keeping the sea anchor buoyant and also preventing the sea anchor from becoming fouled.

While the embodiments of the invention have been disclosed, certain modifications may be made by those skilled in the art to modify the invention without departing from the spirit of the invention.

The inventor claims:

1. A device and method to generate power using river current, which is comprised of:
   a. a sea anchor;
      wherein the sea anchor is placed in the river;
      wherein said sea anchor is of a predetermined shape;
   b. sea anchor floats;
      wherein a plurality of sea anchor floats is placed on a portion of the sea anchor;
   c. reinforcing member;
      wherein a reinforcing member is placed on the sea anchor;
   d. a plurality of sea anchor cables;
      wherein the plurality of sea anchor cables secure a cable ring to the sea anchor;
   e. first pulley cable;
      said first pulley cable is secured to the cable ring at one end;
      said first pulley cable is secured to electrical generating means at the second end;
      said first pulley cable rotates over a first pulley;
   f. second pulley cable;
      said second pulley cable is secured to the interior of the sea anchor at one end;
      said second pulley cable travels a predetermined distance away from the electrical generating station;
      said second pulley cable travels over a second pulley;
   g. a cable ring;
   h. a first pulley;
   i. a second pulley;
   j. an electrical generating station;
      wherein the electrical generating station is of a predetermined shape;
      wherein the electrical generating station generates electrical power;
   k. a platform;
      wherein the platform secures the electrical generating station;
      said platform is of a predetermined shape;
   l. pontoons;
      wherein a plurality of pontoons is attached to the electrical generating station;
   m. software;
      wherein the software controls the movement of the cables.

2. The device as described in claim 1 wherein the platform is secured to the river bottom.

3. The device as described in claim 1 wherein the platform is not secured to the river bottom.

4. The device as described in claim 1 wherein a computer operated generating system is operated remotely.

5. The device as described in claim 1 wherein the power that is generated may be stored.

6. The device as described in claim 1 wherein the power that is generated is linked to a power grid.

* * * * *